Figure 2:
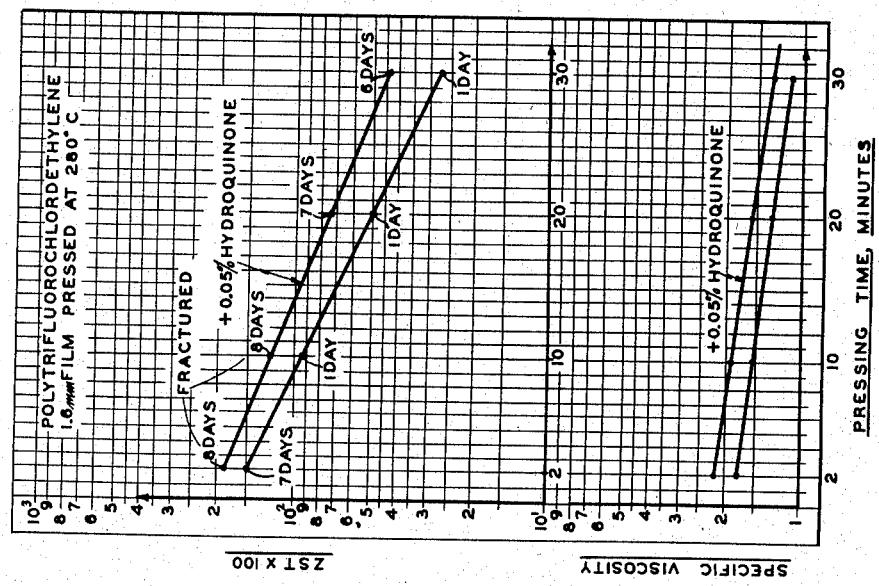
Figure 1:
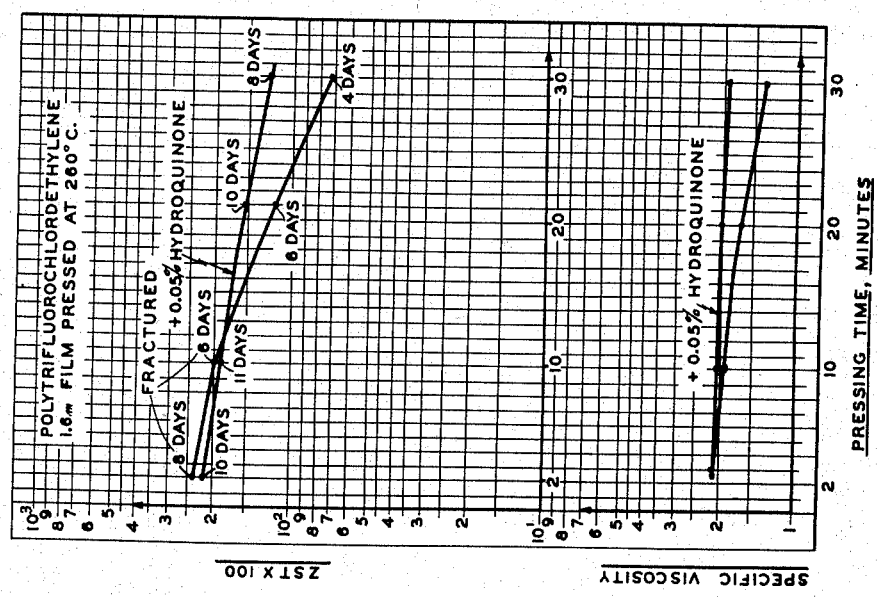
Figure 4:
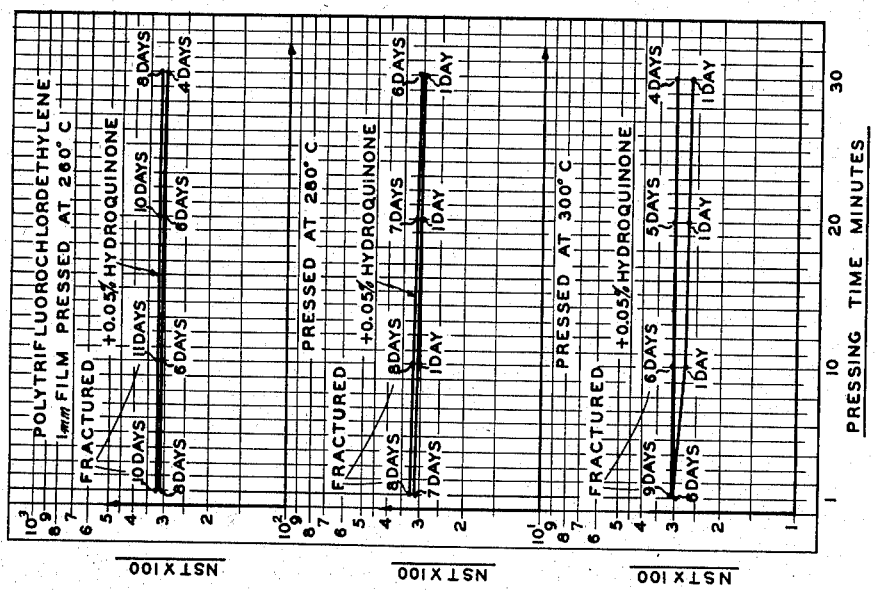
Figure 3:
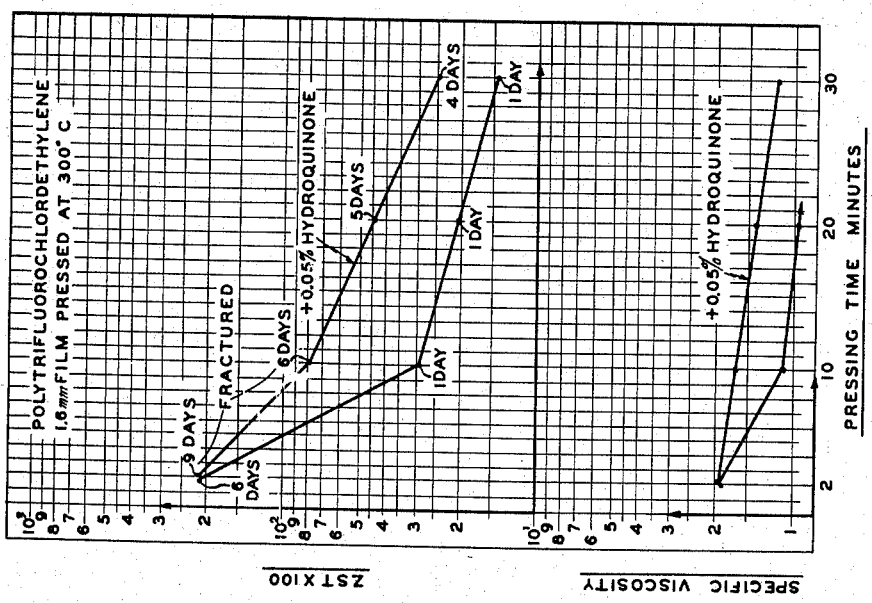

Oct. 6, 1959  HANS-HELMUT FREY ET AL  2,907,742
STABILIZATION OF PERFLUOROCHLOROOLEFIN POLYMERS
Filed March 12, 1956                      2 Sheets-Sheet 1

INVENTORS
HANS – HELMUT FREY
RICHARD HUTH
BY
ATTORNEYS

2,907,742

STABILIZATION OF PERFLUOROCHLOROOLEFIN POLYMERS

Hans-Helmut Frey and Richard Huth, Frankfurt am Main, Germany, assignors to Farbwerke Hoechst Aktiengesellschaft vormals Meister Lucius & Brüning, Frankfurt am Main, Germany, a corporation of Germany Application March 12, 1956, Serial No. 570,762

Claims priority, application Germany April 13, 1955

12 Claims. (Cl. 260—45.95)

This invention relates to the treatment of perfluorochloroolefin polymers. In one aspect the invention relates to the stabilization of polymers of trifluorochloroethylene. In another aspect the invention relates to a method for improving the heat aging characteristics of polytrifluorochloroethylene plastics.

Fluorine-containing polymers, and particularly the perfluorochloroolefin polymers have gained increasing interest because of their chemical and thermal stability. Among these fluorine-containing polymers, polymers of trifluorochloroethylene have been introduced successfully on account of their many uses in the plastics field. With respect to the homopolymer of trifluorochloroethylene, four-fifths of its weight is halogen, and one-half of its weight is fluorine, which accounts for the remarkable qualities of this thermoplastic product.

In order to obtain an end item which exhibits the excellent qualities of these polymers, processing of this type of polymer requires, in particular, the adherence to optimum operating conditions in which the peculiarities of the fluorine-containing polymer are borne in mind.

Thus, in the case of the homopolymer of trifluorochloroethylene, in contrast to most other thermoplastics, the temperature interval between the appearance of the plastic state and the beginning of decomposition is very narrow. An additional peculiarity encountered with this polymer is that, again in contrast to many other thermoplastics, on melting or softening respectively, it changes into a highly viscous, tough mass which, on further temperature increase, still becomes somewhat more fluid at which point, however, the range of initial decomposition has already been reached. The plasticizing of polytrifluorochloroethylene, places only a limited operating range at one's disposal.

As a consequence, the production of shaped pieces, injection moldings or extrusion profiles require very accurate temperature control if one does not wish to risk extensive damage of the material caused by the use of too high a temperature during fabrication.

Such damage to the material due to extremely high fabrication temperatures is very markedly evidenced by the occurrence of bubbles in the end item. These bubbles are believed due to decomposition products of the polymer of trifluorochloroethylene resulting from the breakdown of the polymer chain with the consequent formation of low molecular weight decomposition products which because of their volatility at high temperature give rise to bubbles.

Such damage to the product can be easily recognized. However, the degradation of the product does not always give rise to bubbles, and after improper treatment an extensively degraded end item may not always be distinguished visually from one which has been exposed to but little thermal stress. However, a measurement of the physical properties will usually indicate that considerable differences exist following exposure to stress after treatment.

Such a breakdown can be observed by a determination of the specific viscosity, the N.S.T. value and the ZST value (see the comments in Example 1), by the behavior in the plastometer, and by noting the corresponding decrease of these values with increasingly stronger temperature stresses. Moreover, a greater material degradation is paralleled by an increased tendency to brittleness after storage of the test sample at higher temperatures, i.e., the more the material is exposed to stress the more brittle it becomes. This property is measured for polymers of trifluorochloroethylene by storing a strip of 1 cm. width and 1.6 mm. thickness at 190° C. and by determining the time at which this strip breaks on bending it around a pin of 6.5 mm. diameter.

Since in practice it will never be quite possible to carry out an exact adjustment and control of the temperature in a machine which processes thermoplastics, because very frequently neither the operating personnel nor the apparatus are equipped for this purpose, attempts have been made to overcome this drawback by designing special processing machinery which would allow for the peculiar properties of this thermoplastic. Because of the high viscosity values of the thermoplastic at the processing temperature, the use of shortened, heated, injection channels in multiple injection molding has been recommended. This prevents a cooling of the melted mass on its passage through the machine at any single point which cooling would affect the quality of injection-molded products. This particular arrangement in the injection molding process moreover, permits a reduction of the processing temperature whereby the quality of the material is preserved. This arrangement is naturally limited to multiple injection molding, and can not be adapted to other important methods of production like single injection molding, extrusion and pressing. Furthermore, it requires an extensive reconstruction of any existing machine, or else the construction of a new type of machine, both of which methods are extremely costly. It will always be the goal of industry to make use of available machinery for the processing of new thermoplastics entering the market, or, at most, to manage with minor modifications which make allowance for the special properties of these new types of plastics. This demand is met by the suggestion that polymers of trifluoroethylene be stabilized as is done with other plastic materials. Thus, alkali and alkaline earth salts of the oxy-halogen acids are known as stabilizers at relatively low processing temperatures. Furthermore, oxides and acetates of the alkaline earth metals and, in addition, alkyl and aryl derivatives of lead and tin are known as stabilizing agents.

During treatment by the simplest of processing methods, that is, the pressing method, it was noted that even at the average and usual processing temperatures for polymers of trifluoroethylene containing $KClO_3$, no stabilizing effect could be observed, and that at the usual upper processing temperature the stabilizing agent, e.g., $KClO_3$, gave rise to the formation of decomposition bubbles. The reason may possibly be found in the initial decomposition of the $KClO_3$ and in the incompatibility of this material with polymers of trifluorochloroethylene. Moreover, a number of the additives mentioned cause decolorizing. This applies especially to amines which, after exposure to heat, yield dark to almost black films, since in all probability a reaction of the amine with the polymer chain takes place. This was also found with aminophenols. Polyfunctional amines are used to cross link polymers of trifluorochloroethylene.

It is an object of this invention to provide a process for improving the thermal stability of perfluorochloroolefin polymers.

It is another object of this invention to provide a means for stabilizing polymers of trifluorochloroethylene.

It is one of the more particular objects of this invention to improve the thermal stability of polymers of trifluorochloroethylene.

It is another of the particular objects of this invention to provide a means for molding polymers of trifluorochloroethylene at temperatures approaching decomposition temperature.

Various other objects and advantages will become apparent to those skilled in the art on reading the accompanying description and disclosure.

Generally, the above objects are accomplished by admixing with, and intimately dispersing within the polymer a minor proportion of a polyvalent aromatic nuclear-substituted oxygen compound which functions as a stabilizing agent and which improves the thermal stability of the perfluorochloroolefin polymers and particularly polymers of trifluorochloroethylene. The term "polymer" includes both homopolymers and copolymers.

The discovery of these new stabilizers appears to prove that the thermal degradation, e.g., of polymers of trifluorochloroethylene, proceeds according to a radical mechanism, for it has been shown that precisely those substances which are known as polymerization inhibitors develop an excellent stabilizing effect with polymers of trifluorochloroethylene. When treated according to the present invention, a less severe decrease of the N.S.T. value, the ZST value and the specific viscosity is observed when the fluorine-containing polymer is exposed to thermal and mechanical stresses during processing. Furthermore, the tendency to become brittle is reduced.

Among the polyvalent aromatic nuclear-substituted oxygen compounds (i.e., a polyvalent aromatic compound in which a carbon atom in the ring is bonded to an oxygen atom outside the ring) which have a stabilizing effect, e.g., on polymers of trifluorochloroethylene, divalent and polyvalent phenols and quinones have proved satisfactory. Among the phenols are mentioned: pyrocatechol, resorcinol, hydroquinone, pyrogallol, 4,4'-dihydroxy-diphenyl. Among the quinones are mentioned: 1,4-benzoquinone. The stabilizer can be added in an amount between about 0.01 and about 5 percent by weight based on polymer and preferably between 0.02 and 2 percent. In case very small percentages of stabilizer are used, it is recommended that, for the purpose of a homogeneous distribution of the stabilizer, the latter be dissolved in a solvent, the solution be then mixed with the polymer, and that the solvent be subsequently evaporated by heating. The two components may also be introduced together into the processing machine where they will become mixed in the course of the procession operation. In the case of precompressed material the mixture can be effected by rolling the granulate with the stabilizer in a suitable container. Complete mixing then proceeds in the course of processing. Even with additions like fillers, coloring matter, binders, inserts, etc., the use of these stabilizers is indicated, since their addition results in a considerably less degraded material.

This class of stabilizers is not limited to the homopolymer of trifluorochloroethylene, but is also applicable to the copolymers of trifluorochloroethylene with other monomers, such as vinylidene fluoride, trifluoropropylene, tetrafluoroethylene, etc., and containing above 20 mol percent of trifluorochloroethylene.

The addition of these stabilizers is fundamentally indicated in all methods of processing, but in particular in pressing, extrusion and injection molding. In the pressing method, however, the effect of the stabilizers can be checked most simply and rapidly, so that the stabilizing action on polymers of trifluorochloroethylene will be demonstrated with particular reference to this method.

*Example 1*

A homopolymer of trifluorochloroethylene in powder form was carefully ground in a mortar with 0.05% hydroquinone as a stabilizer, and was pressed into 1.6 mm. films under various pressing temperatures and pressures. The powder was brought up to the processing temperature in the press for a period of five minutes without pressure.

To determine the stabilizing effect of the additive, the quenched film was tested for the N.S.T. value according to U.S. Patent 2,626,254, the ZST value according to Modern Plastics, October 1954, p. 146, the specific viscosity in 1% solution of 2,5-dichlorobenzotrifluoride, and the time was determined after which film strips stored at 190° C. became brittle. The values obtained were plotted in diagrams 1, 2, 3 and 4 in comparison to the non-stabilized material.

It can be seen from the diagrams that the addition of the stabilizer results in a definitely slighter degradation of the material, so that the stabilized polymer of trifluorochloroethylene, after exposure to thermal stress, exhibits higher N.S.T. and ZST values, higher specific viscosities, and does not become brittle as rapidly when heated as does the unstabilized polymer of trifluorochloroethylene.

*Example 2*

A homopolymer of trifluorochloroethylene in powder form was mixed with 0.5% of a pigment color consisting of cadmium selenite, and with 0.5% hydroquinone, and was preheated at 300° C. for 5 minutes, and was then pressed for ten minutes under pressure.

Measurements of the film gave an N.S.T. value of 300° C. and ZST value of 746 seconds. It becomes brittle after 5–6 days in hot storage at 190° C., whereas without any addition of hydroquinone and under identical conditions of pressing, an N.S.T. value of 290° C. and a ZST value of 309 seconds was obtained and the film became brittle after 1–3 days storage at high temperatures.

*Example 3*

A trifluorochloroethylene copolymer containing 2 mol percent vinylidene fluoride was thoroughly mixed with 0.05% hydroquinone, was preheated at 300° C. for 5 minutes, and pressed for 30 minutes under pressure. The film fails to turn brittle even after 34 days' storage at 190° C., whereas a film of this copolymer without the addition of hydroquinone, under identical conditions became brittle after 9 days' storage under heat conditions.

*Example 4*

A trifluorochloroethylene copolymer containing 1 mol percent of trifluoropropylene was pressed into a 1.6 mm. film at 260° C. with 5 minutes' preheating, and by pressing for 2 minutes. The film became brittle in hot storage after 1–2 days.

After the addition of 0.5% stabilizer and pressing under identical conditions, films were obtained which required more than 1–2 days to become brittle in hot storage, the following times being required:

Pyrocatechol _____ After 11–14 days.
Pyrogallol _____ After 4–6 days.
4,4-dihydroxydiphenyl _____ After 11–13 days.

However, when the known potassium chlorate stabilizer was used, brittleness occurred after one day.

*Example 5*

A homopolymer of trifluorochloroethylene in powder form together with 0.5% of 1,4-benzoquinone, was pressed at 260° C. with 5 minutes preheating, and under pressure for 2 minutes. The film had a ZST value of 672 seconds and breaks after 3 days' hot storage at 190° C. Without any addition of stabilizer, a ZST value of 666 seconds was measured, and breakage occurs after only 2 days. When the same mixture was pressed at 200° C. with 5 minutes' preheating and pressure for 10 minutes, the ZST value of the film was 329 seconds and it breaks after 2–3 days. Pressed under identical conditions and without any additive, the film has a ZST value of 209 seconds and breakage occurs after only one day of heat storage.

Various alterations and modifications of the invention and its aspects may become apparent to those skilled in the art without departing from the scope of this invention.

Having thus described the invention, we claim:

1. A novel plastic composition comprising a polymer selected from the group consisting of a homopolymer of perfluorochloroethylene and a copolymer of more than 20 mol percent perfluorochloroethylene and another monoolefin containing fluorine and having not more than 3 carbon atoms per molecule, and between about 0.01 and about 5 percent by weight based on the weight of polymer of a thermal stabilizer selected from the unsubstituted members of the group consisting of the quinones and the polyhydric phenols, prepared by admixing said thermal stabilizer with said polymer in dry powder form.

2. The composition of claim 1 in which the stabilizer is pyrocatechol.

3. The composition of claim 1 in which the stabilizer is resorcinol.

4. The composition of claim 1 in which the stabilizer is hydroquinone.

5. The composition of claim 1 in which the stabilizer is 4,4'-dihydroxy-diphenyl.

6. The composition of claim 1 in which the stabilizer is 1,4-benzoquinone.

7. A novel plastic composition comprising a polymer selected from the group consisting of a homopolymer of trifluorochloroethylene and a copolymer of more than 20 mol percent trifluorochloroethylene and another monoolefin containing fluorine and not more than 3 carbon atoms per molecule, and between about 0.01 and about 5 percent by weight based on the weight of polymer of a thermal stabilizer selected from the unsubstituted members of the group consisting of the quinones and the polyhydric phenols, prepared by admixing said thermal stabilizer with said polymer in dry powder form.

8. A novel plastic composition comprising a homopolymer of trifluorochloroethylene and between about 0.01 and about 5 percent by weight based on the weight of polymer of a thermal stabilizer selected from the unsubstituted members of the group consisting of the quinones and the polyhydric phenols, prepared by admixing said thermal stabilizer with said homopolymer in dry powder form.

9. A novel plastic composition comprising a copolymer of more than 20 mol percent trifluorochloroethylene copolymerized with another monoolefin containing fluorine and not more than 3 carbon atoms per molecule, and between about 0.01 and about 5 percent by weight based on the weight of copolymer of a thermal stabilizer selected from the unsubstituted members of the group consisting of the quinones and the polyhydric phenols, prepared by admixing said thermal stabilizer with said copolymer in dry powder form.

10. The composition of claim 9 in which the fluorine-containing olefin is vinylidene fluoride.

11. The composition of claim 9 in which the fluorine-containing olefin is trifluoropropylene.

12. The composition of claim 9 in which the fluorine-containing olefin is tetrafluoroethylene.

References Cited in the file of this patent

UNITED STATES PATENTS

| | | |
|---|---|---|
| 2,643,988 | Walter | June 30, 1953 |
| 2,662,867 | Hoertz | Dec. 15, 1953 |